US006975071B2

(12) United States Patent
Tsai

(10) Patent No.: US 6,975,071 B2

(45) Date of Patent: Dec. 13, 2005

(54) VOLTAGE BOOSTER OF HEADLIGHT

(76) Inventor: Tsung-Jung Tsai, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/634,671

(22) Filed: Aug. 6, 2003

(65) Prior Publication Data

US 2004/0189211 A1 Sep. 30, 2004

(51) Int. Cl.[7] ........................... B60Q 1/02; H05B 41/16

(52) U.S. Cl. ........................................ 315/82; 315/224

(58) Field of Search .......................... 315/82, 224, 291, 315/307, DIG. 5

(56) References Cited

U.S. PATENT DOCUMENTS 5,384,518 A * 1/1995 Kido et al. ................. 315/225
5,404,082 A * 4/1995 Hernandez et al. ......... 315/219
5,410,221 A * 4/1995 Mattas et al. ............... 315/307
6,034,489 A * 3/2000 Weng ......................... 315/307
6,124,681 A * 9/2000 Choi .......................... 315/291
6,127,788 A * 10/2000 Yamamoto et al. ......... 315/307
2003/0141845 A1* 7/2003 Krieger et al. .............. 320/132

* cited by examiner

*Primary Examiner*—Tuyet Vo
*Assistant Examiner*—Minh Dieu A

(57) ABSTRACT

A voltage booster of a headlight is connected between a power supply and a headlight and comprises a high frequency circuit, a voltage boost circuit, a rectified circuit, and a high frequency control circuit. The voltage booster comprises an over current sensing circuit connected in front of the headlight and a relay connected between the headlight and the power supply end. When the voltage booster is over circuit, power will supply to the headlight directly. By the voltage booster, the illumination of the headlight is increased and voltage can be stabilized.

1 Claim, 2 Drawing Sheets

VOLTAGE BOOSTER OF HEADLIGHT

FIELD OF THE INVENTION

The present invention relates to voltage booster, and particularly to a voltage booster of a headlight; wherein the voltage booster is connected between a power supply and a headlight for boosting the voltage of the headlight. By the voltage booster, the illumination of the headlight is increased and voltage can be stabilized.

BACKGROUND OF THE INVENTION

The illumination of a car is a very critical factor as the car is driven at night. However, in general, the light of a car is not so great so that the driver can clearly see the front end view.

Thereby, there are many cars which is added some other lights for improving this defect, for example, HID lights. However, HID light can not used in fog or rainy day, even in fog or rainy day, the HID light becomes worse. Moreover, the HID light is too expensive to be accepted by users.

SUMMARY OF THE INVENTION

Accordingly, the primary object of the present invention is to provide a voltage booster of a headlight which is connected between a power supply and a headlight and comprises a high frequency circuit, a voltage boost circuit, a rectified circuit, and a high frequency control circuit. The voltage booster comprises an over current sensing circuit connected in front of the headlight and a relay connected between the headlight and the power supply end; thus as the headlight is over circuit, power will supply to the headlight directly from the relay and the over current sensing circuit is interrupted. By the voltage booster, the illumination of the headlight is increased and voltage can be stabilized.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
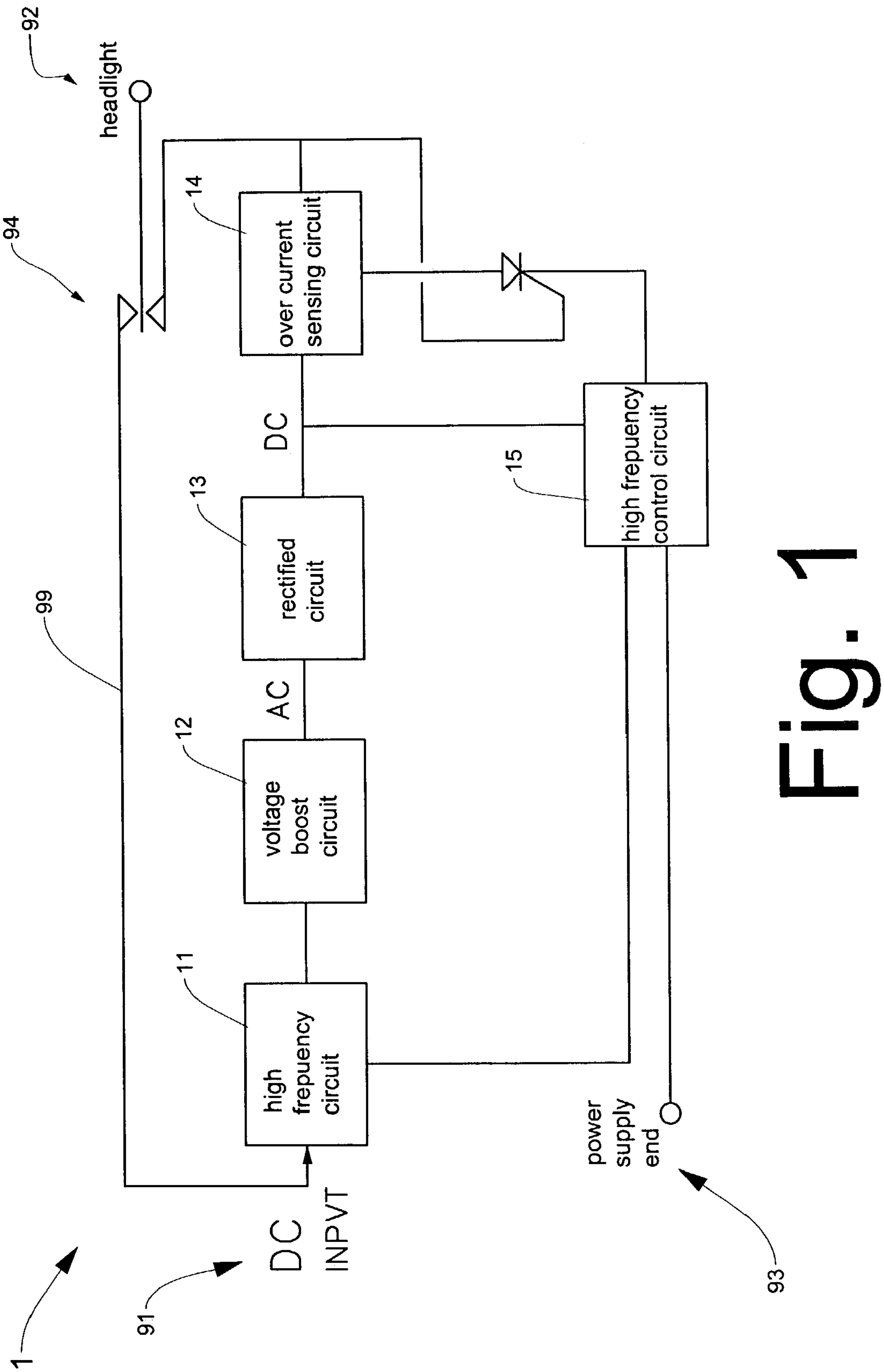
FIG. 1 shows the function block diagram of the present invention.

Referring to FIG. 1, the circuit block diagram of the present invention is illustrated. The headlight voltage booster 1 can be added between a power supply end 91 and a headlight 92.

The headlight voltage booster 1 includes a high frequency circuit 11, a voltage boost circuit 12, a rectified circuit 13, an over current sensing circuit 14, and a high frequency control circuit 15. A front end of the high frequency circuit 11 is connected to the power supply end 91 (in general, it is a DC 12V). Then it is serially connected to the boost circuit 12 and the rectified circuit 13. It is functioned for boosting the voltage to a predetermined value (about DC 14.8V, or other value). Furthermore, the high frequency control circuit 15 is further connected to the headlight control wire 93.

An over current sensing circuit 14 is connected between the headlight 92 and the rectified circuit 13. The headlight 92 is connected to the power supply 91 through a wire 99 with a relay 94 connected between the headlight 92 and the power supply end 91. If the headlight 92 is over-current, than the over current sensing circuit 14 is interrupted so that the power is supplied to the headlight 92 through the wire 99 and the present invention is not used.

Figure 2:
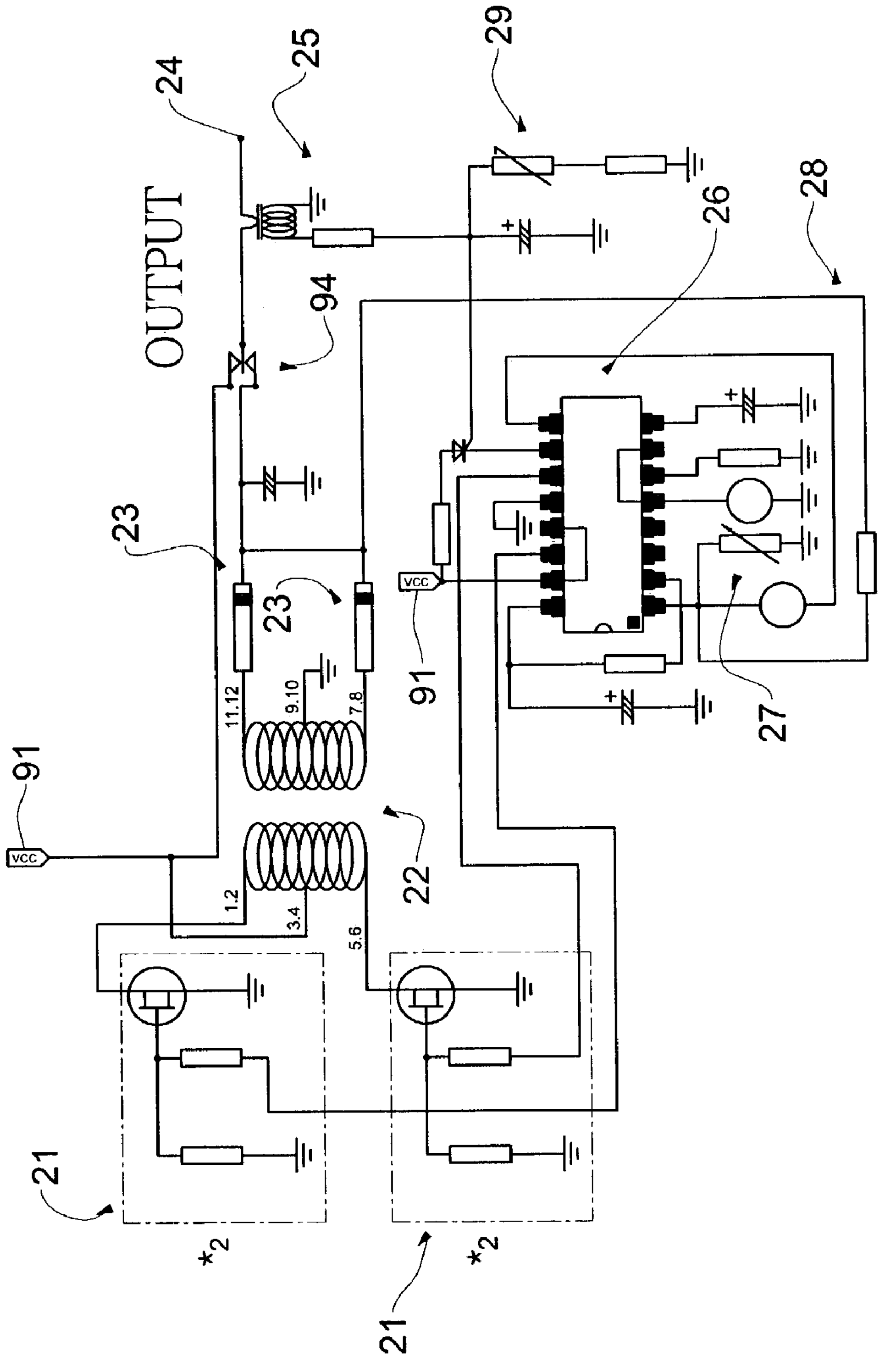
FIG. 2 shows the circuit of the present invention.

Referring to FIG. 2, the circuit of FIG. 1 is illustrated. The DC current is supplied from the power supply end 91. The current flows through two high frequency oscillators 21 and then is boosted by the boosting coils 22. Then the current is rectified by the diode 23 as a DC current (Direct Current). Then the current is outputted from output end 24.

To assure the operation is normal, a current comparator 25 is used with the relay 94 as a switching.

In the present invention, a high frequency oscillating IC 26 and a modulator 27 are installed for modulating output current. The feedback circuit 28 serves to regulate current.

The modulator 29 serves to modulate the currrent for determining the critical condition of the relay 94.

As a car is used as an example, the voltage of the headlight is generally 12V to match the voltage of the battery. By using the present invention, the voltage of the headlight 92 can be adjusted as 14.8 to 17V so as to increase the illumination.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A voltage booster of a headlight for increasing a voltage of the headlight; the voltage booster being connected between a power supply and a headlight; the voltage booster comprising a high frequency circuit, a voltage boost circuit, a rectified circuit, and a high frequency control circuit;

wherein a DC current is supplied from the power supply end; then the current flows through two high frequency oscillators which are parallel connected and then is boosted by boosting coils; then the current is rectified by the diode as DC current and then is outputted from an output end; and wherein an over current sensing circuit is connected between the headlight and the rectified circuit; the headlight is connected to the power supply through a wire with a relay connected between the headlight and the power supply end; if the headlight is over-current, than the over current sensing circuit is interrupted so that the power is supplied to the headlight through the wire.

* * * * *